(12) United States Patent
Dickson (10) Patent No.: US 7,082,406 B1
(45) Date of Patent: Jul. 25, 2006

(54) MULTI-STAGE ACCOUNTING SYSTEM FOR A FUELING ENVIRONMENT

(75) Inventor: Timothy E. Dickson, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 728 days.

(21) Appl. No.: 09/599,712

(22) Filed: Jun. 22, 2000

(51) Int. Cl.
*G06F 17/60* (2006.01)

(52) U.S. Cl. .............................. 705/24; 705/16; 705/18; 705/21

(58) Field of Classification Search ................... 705/24, 705/16, 17, 18, 21; 700/231, 236, 237, 241, 700/302
See application file for complete search history.

(56) References Cited

U.S. PATENT DOCUMENTS

| | | | |
|---|---|---|---|
| 3,642,036 A | 2/1972 | Ginsburgh et al. | 141/94 |
| 5,072,380 A | 12/1991 | Randelman et al. | 364/406 |
| 5,238,034 A * | 8/1993 | Corfitsen | 141/94 |
| 5,392,049 A | 2/1995 | Gunnarsson | 342/42 |
| 5,393,195 A | 2/1995 | Corfitsen | 414/749 |
| 5,404,923 A | 4/1995 | Yamamoto et al. | 141/279 |
| 5,414,427 A | 5/1995 | Gunnarsson | 342/51 |
| 5,596,972 A | 1/1997 | Sultan et al. | 123/520 |
| 5,609,190 A | 3/1997 | Anderson et al. | 141/59 |
| 5,609,192 A | 3/1997 | Anderson et al. | 141/208 |
| 5,613,535 A | 3/1997 | Loen | 141/226 |
| 5,621,411 A | 4/1997 | Hagl et al. | 342/42 |
| 5,628,351 A | 5/1997 | Ramsey et al. | 141/98 |
| 5,634,503 A | 6/1997 | Musil et al. | 141/232 |
| 5,644,119 A | 7/1997 | Padula et al. | 235/384 |
| 5,655,577 A | 8/1997 | Loen et al. | 141/59 |
| 5,671,786 A | 9/1997 | Corfitsen | 141/94 |
| 5,705,999 A | 1/1998 | West et al. | 340/941 |
| 5,727,608 A | 3/1998 | Nusbaumer et al. | 141/94 |
| 5,895,457 A | 4/1999 | Kurowski et al. | 705/413 |
| 5,913,180 A | 6/1999 | Ryan | 702/45 |
| 5,944,069 A * | 8/1999 | Nusbaumer et al. | 141/94 |
| 5,954,102 A | 9/1999 | Sato et al. | 141/83 |
| 5,956,259 A | 9/1999 | Hartsell et al. | 364/528.37 |
| 5,971,040 A | 10/1999 | McFarland et al. | 141/98 |
| 5,984,416 A | 11/1999 | Waldo et al. | 297/411.38 |
| 6,070,156 A | 5/2000 | Hartsell, Jr. | 705/413 |
| 6,152,591 A * | 11/2000 | McCall et al. | 700/231 |

FOREIGN PATENT DOCUMENTS

| | | |
|---|---|---|
| WO | WO 95/14612 | 6/1995 |
| WO | WO 95/32919 | 12/1995 |
| WO | WO 96/39678 | 12/1996 |
| WO | WO 97/24689 | 7/1997 |

OTHER PUBLICATIONS

Netherlands: Pilot Project at Shell; Kölner Stadt-Anzeiger (XHD); Jan. 29, 1998, p. 18.*
Autofill Inc. "Autofill", pp. 6.

* cited by examiner

*Primary Examiner*—Elaine Gort
(74) *Attorney, Agent, or Firm*—Withrow & Terranova, PLLC (57) ABSTRACT

A service station for the sale and dispensing of fuel into customers' vehicles and a method of optionally delivering a transaction accounting thereof to the customer, wherein the receipt station is located separately from the fuel dispensers. Costs to manufacture and maintain a plurality of fuel dispensers are reduced by migrating this function to a single station. Upon fueling, an indicia is associated with each transaction, and this indicia is input at the receipt station to retrieve the associated transaction data. In the preferred embodiment, the indicia is sensed automatically by the receipt station via a transponder mounted on the customer's vehicle or carried by the customer.

19 Claims, 10 Drawing Sheets

```
HAN'DEE HUGO 50
102 Gregson St.
Cary, N.C.

04/19/00          10:30
STN #         47677646

BP OIL

INV #       1030190006
REF #       4008083053
CREDIT              51
PUMP#02         UNLEAD
GALLONS         10.771
   @ $1.419/GAL
FUEL            $15.28

TL/NOTAX        $15.28
TAX PD           $0.00
TOTAL           $15.28

THANK YOU!
PLEASE COME AGAIN.
```

FIGURE 10

MULTI-STAGE ACCOUNTING SYSTEM FOR A FUELING ENVIRONMENT

FIELD OF THE INVENTION

The present invention relates to a system and method for dispensing fuel to customers, and to a system and method for delivering an accounting of a fuel delivery transaction to a customer at a location separate from the fuel dispenser.

BACKGROUND

A typical fuel dispenser includes the ability to pay for fuel at the fuel dispenser without having to pay for such transaction remotely such as in a convenience store. Such fuel dispensers have input and output devices directed towards the customer. Input directives include payment selection, grade of fuel to be delivered, and hose selection. Fuel dispensers often include a payment medium such as a magnetic card reader, bar code reader, or wireless communication to determine the customer's account number to which to charge the fueling transaction. Fuel dispensers also have various selection input buttons (often including a numeric keypad for inputting, e.g., a PIN), an LED and/or LCD display, and a receipt printer—in addition to one or more hoses for dispensing the fuel. Output devices include accounting of the fueling transaction such as total cost and volume of fuel dispensed and the price per volume, displays for instructions, and receipt for record of fueling transaction.

The functions performed at a fuel dispenser include obtaining a customer's credit card or other account information, selection of fuel grade, optional purchase of additional products and/or services (e.g., a car wash), and printing a receipt containing an accounting of the transaction. In short, the entire fuel sales transaction can be accomplished by the customer at the fuel dispenser, without the need for any action by a salesperson or attendant. In fact, totally automated fuel dispensing parks, i.e., with no human operators, are known in the art.

Currently undergoing research and development are a variety of systems for automating fuel dispensing. Sometimes, these systems employ a robotic fuel dispensing mechanism to dispense fuel into the customer's vehicle, obviating the need for manual actuation of the hose and nozzle of present fuel dispensers, by either the customer or an attendant. A natural result of such automation may include the reduction of input and/or output devices at the fuel dispenser. The input and output device dramatically increase the cost of a fuel dispenser, as compared to one of comparable functionality without such components. These components also decrease the reliability of the fuel dispenser, as each must be made relatively weatherproof. For instance, the customer may not need to input a grade selection for fuel if the customer is using a transponder to pay for fuel that also includes and communicates the customer's grade selection to the fuel dispenser. However, fully automated fuel delivery systems still may need to perform certain interface functions with the customer such as delivery of a receipt or accounting of the fueling transaction, and thus may require some input and/or output devices.

DETAILED DESCRIPTION OF THE INVENTION

Referring now to the drawings in general, it will be understood that the illustrations are for the purpose of describing the invention and are not intended to limit the invention.

Figure 1:
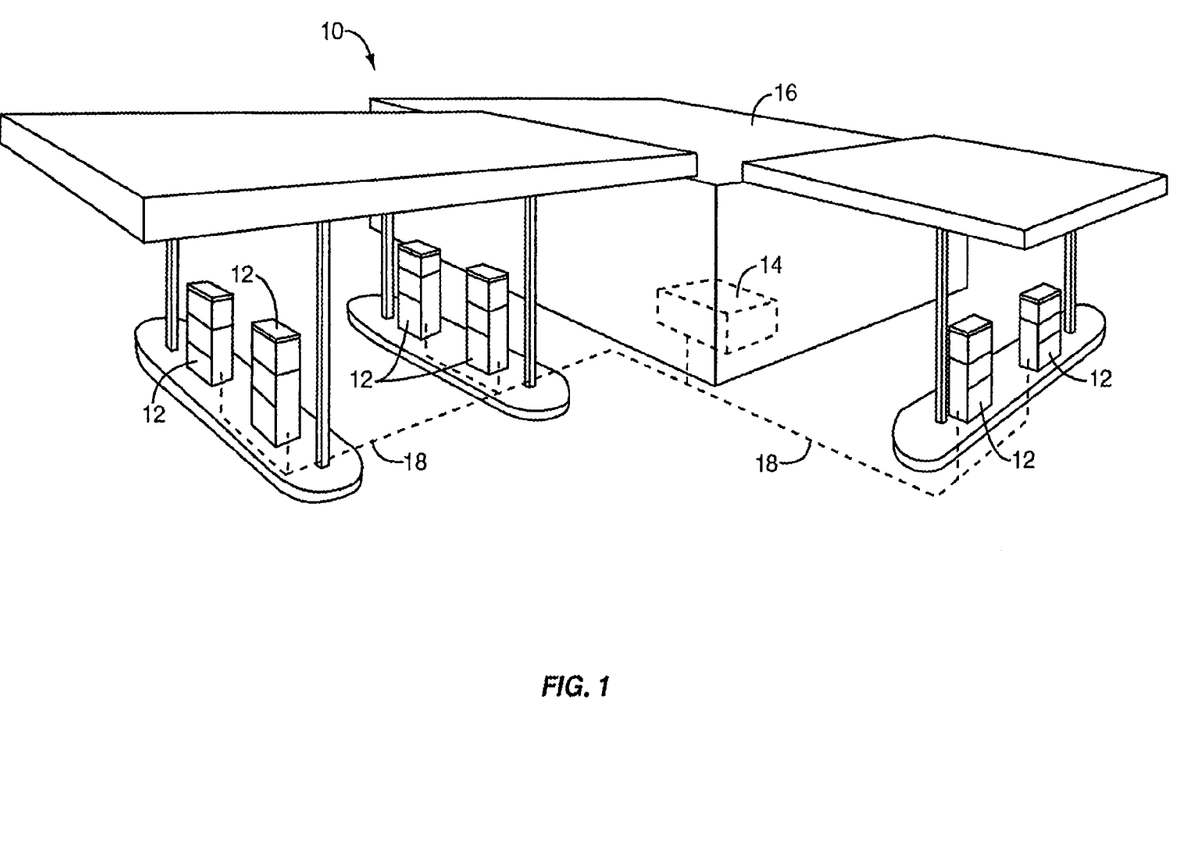
FIG. 1 is a schematic diagram of a prior art fuel dispenser service station.

FIG. 1 (prior art) illustrates a service station 10 with fuel dispensers 12 for performing vehicle fueling, wherein each fuel dispenser 12 is in data transfer communications with a system controller 14 located within the service station's convenience store 16, in this case via underground data communications wire 18.

Figure 2:
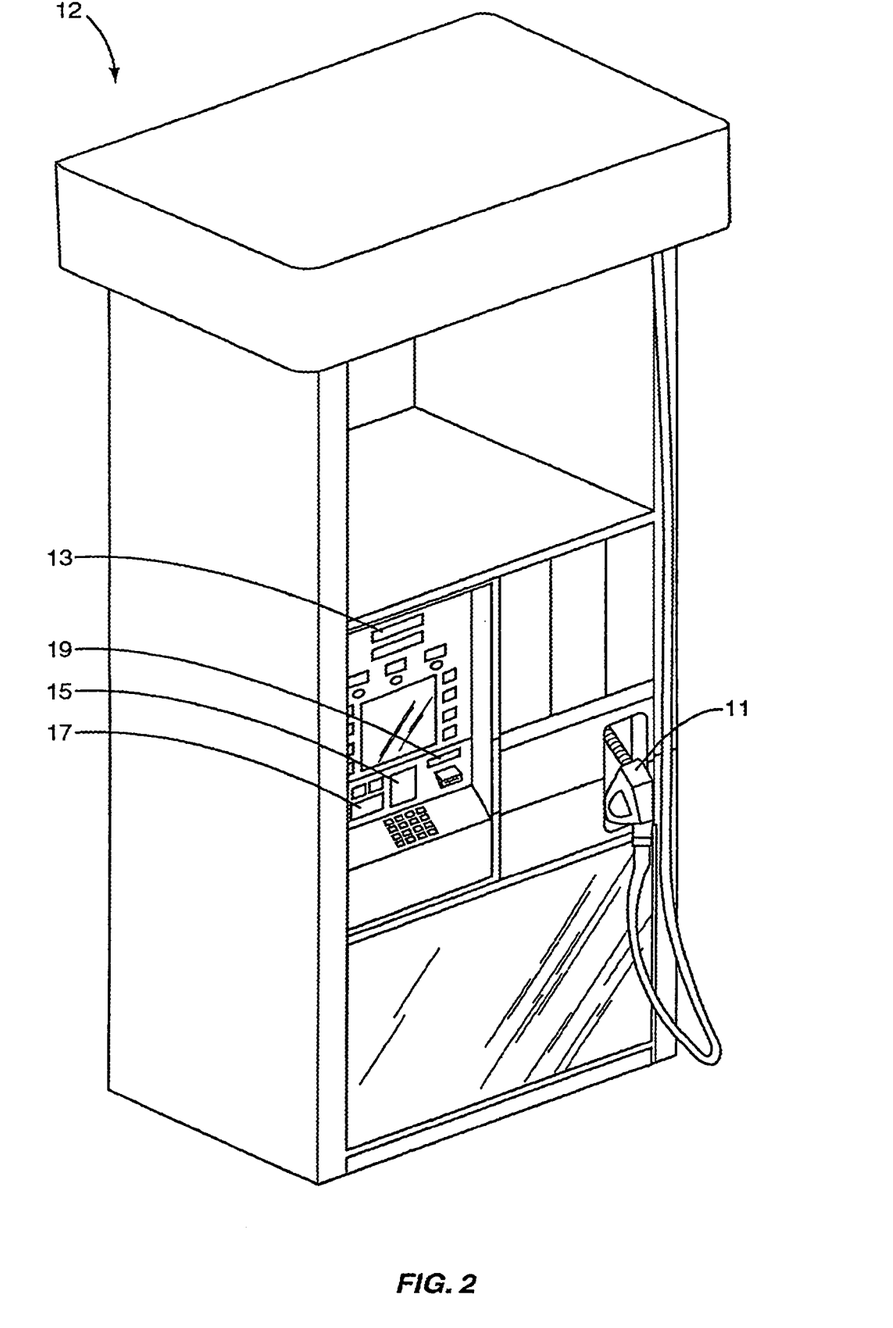
FIG. 2 is a schematic diagram of a fuel dispenser.

FIG. 2 illustrates a typical fuel dispenser in commercial use today. The fuel dispenser 12 has a hose 11 for dispensing fuel and a transaction display 13 for displaying the total amount of fuel dispensed and total amount of the sale to the customer. The fuel dispenser 12 may also include payment mechanisms such as a cash acceptor 17 or a card reader 15 for automated processing of payment without the customer having to pay an attendant located within the service station 10. The fuel dispenser 12 also includes a receipt station 19 for delivering an accounting of the fueling transaction to the customer when completed. The receipt station 19 is adapted to provide an accounting of the customer fueling transaction to the customer by physical medium such as a paper receipt or through electronic communications. Therefore, the receipt station 19 may be a conventional receipt printer or electronic device able to transmit such accounting electronically either through wiring or wirelessly. The receipt station 19 may also include other information such as a numeric code if other services are purchased by the customer before, during and/or after fueling such as a car wash. The numeric code links the services to be delivered to the customer's payment medium for a combined single transaction for convenience purposes.

A. System Configurations

Figure 3:
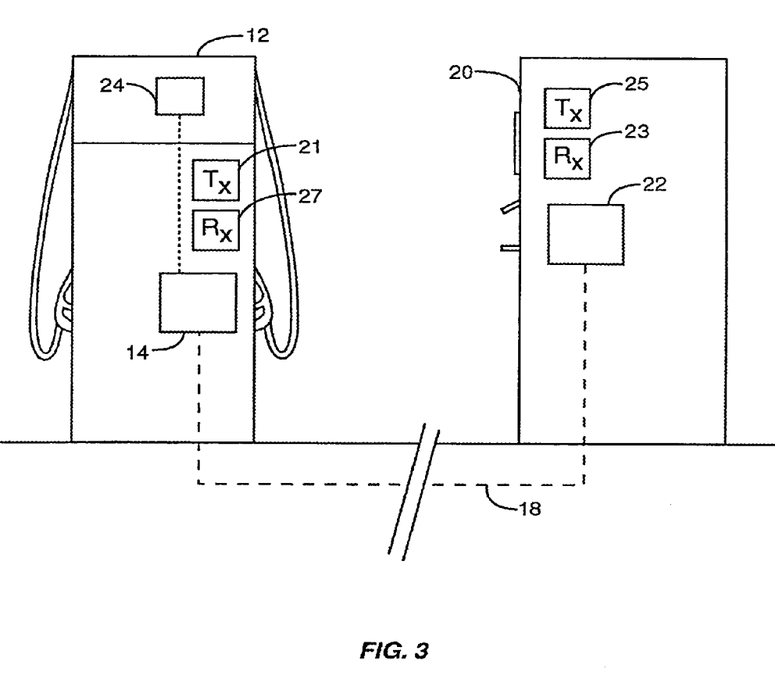
FIG. 3 is a schematic of a fuel dispenser and a receipt station, with the system controller located in the fuel dispenser.

FIG. 3 illustrates a receipt station 20 according to the present invention located separately from a fuel dispenser 12, wherein the system controller 14 is co-located with the fuel dispenser 12. System controller 14 is located within fuel dispenser 12, and is connected in bi-directional communications with fuel dispenser 12 electronics 24. The receipt station 20 contains control electronics 22 in data receiving communication with the system controller 14 in fuel dispenser 12, via underground data communications wire 18. This data communication link could comprise a wired (twisted pair, coaxial cable, FDDI, etc.) or a wireless (radio frequency (RF), infrared (IR), etc.) link. For a wireless link, transmitter 21 is required at the fuel dispenser 12, and a corresponding receiver 23 is required at the receipt station 20. As used herein, the term "transmitter" means an interface circuit that transmits data over a wireless connection, such as an RF or IR transmitter that transmits appropriately modulated data at the relevant frequency. Similarly, as used herein, the term "receiver" means an interface circuit that receives data over a wireless connection, such as an RF or IR receiver that receives, demodulates, decodes, and otherwise interprets appropriately modulated data at the relevant frequency. However, the present invention is not limited to any particular type of communications.

Both wired and wireless data transfer communications systems are well known in the art and understood by one of ordinary skill in the art. The communication link must transfer transaction information, such as fuel grade and quantity, from the fuel dispenser 12 to the receipt station 20. If an acknowledgement from the receipt station 20 back to the fuel dispenser 12 is required or desired, then a second data communication link is required, placing the receipt station 20 in data transmitting communication with the fuel dispenser 12. In this case, the receipt station 20 will require a transmitter 25 and the fuel dispenser 12 will require a receiver 27, in addition to the previously delineated interface circuits.

Figure 4:
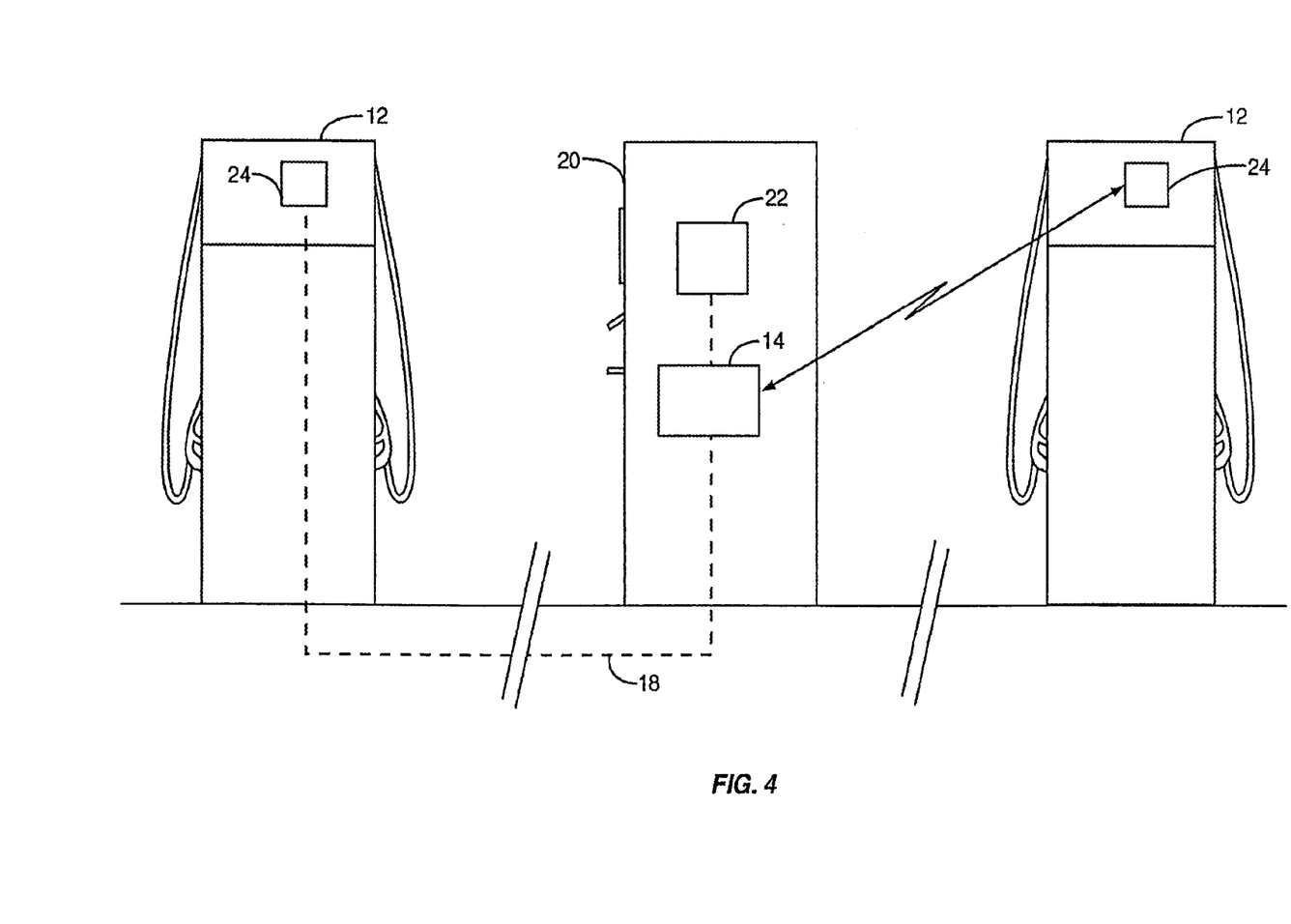
FIG. 4 is a schematic of fuel dispensers and a receipt station, with the system controller located in the receipt station.

In another aspect, the invention relates to a receipt station 20 located separately from one or more fuel dispensers 12, wherein the system controller 14 is located separately from but in communication with the fuel dispensers 12. The system controller 14 may be co-located with the receipt station 20, as shown in FIG. 4, or alternatively it may be located separately and remotely from the receipt station 20, for example in an adjacent sales office or convenience store, where it may additionally comprise an operator interface, as depicted in FIG. 1. The system controller 14 may be an integrated controller and point-of-sale system or cash register used by an operator to completed purchases inside the convenience store. In either case, each fuel dispenser 12 and the receipt station 20 are data transfer communication with the system controller 14. These communications links may be wired or wireless, as discussed above.

Figure 5:
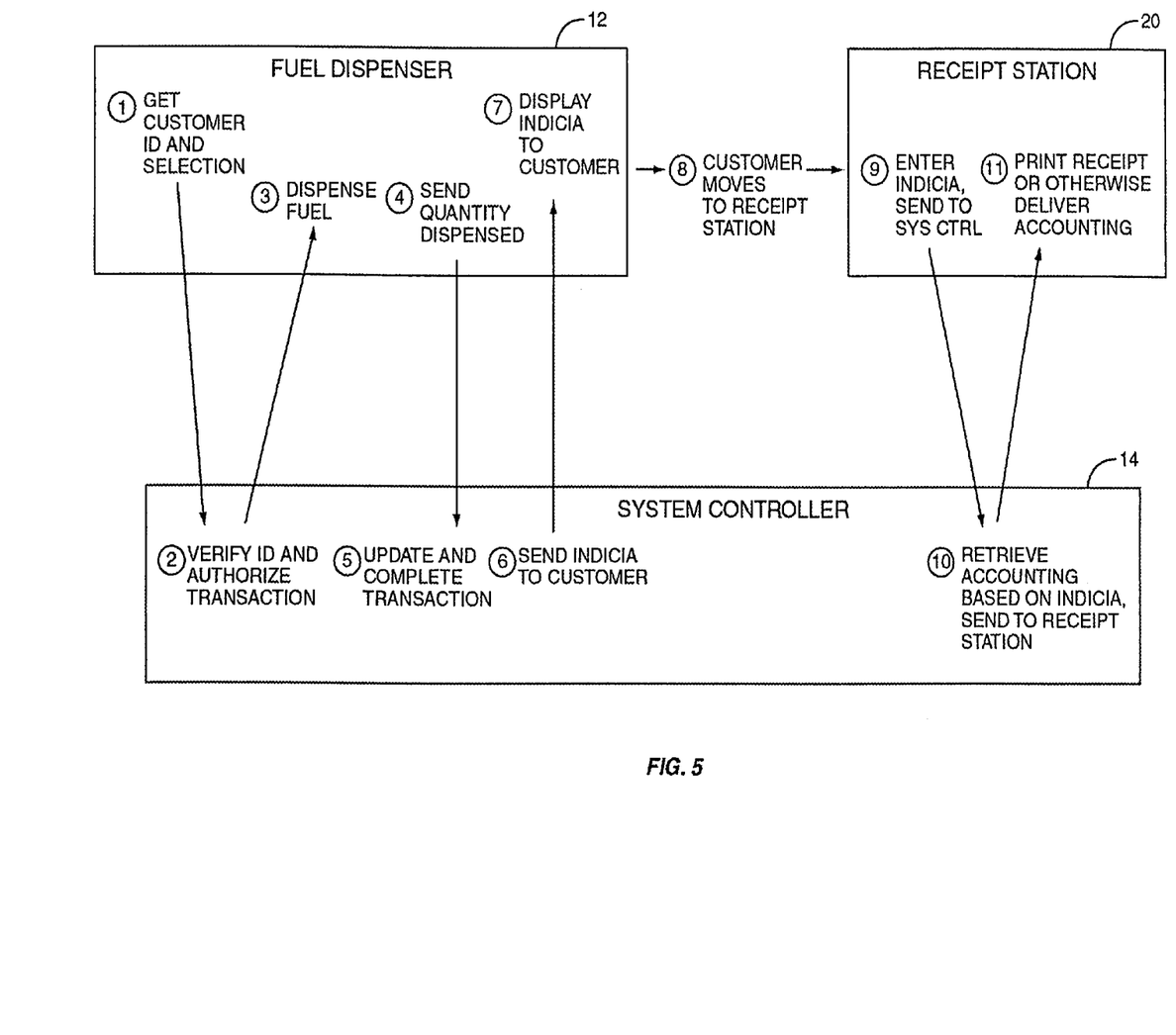
FIG. 5 is a control flow diagram depicting system component communications.

In this configuration as depicted diagrammatically in FIG. 5, customer-identifying information and selections gathered at a fuel dispenser 12 are transmitted to the system controller 14 (step 1). The system controller 14 performs the required transaction authorization processing, and creates an initial accounting of the transaction, wherein each transaction is uniquely identified by an indicia. The system controller 14 transmits authorization to the fuel dispenser 12 (step 2), which begins dispensing fuel (either manually under the control of the customer or an attendant, or automatically via a robotic system) (step 3). When the authorized amount of fuel has been dispensed, or when the tank is full, the fuel dispenser 12 transmits a termination indicator and the quantity of fuel actually dispensed to the system controller 14 (step 4). The system controller 14 updates the transaction accounting to indicate the quantity actually dispensed and the transaction total. The system controller 14 then completes the transaction by conventional transaction processing communications (step 5), as is well understood in the art.

For credit card transactions for which the customer indicated a desire to receive a receipt, the system controller 14 transmits an indicia to the fuel dispenser 12 for delivery to the customer (step 6). This could, for example, take the form of a short numeric code displayed on an LED or LCD display at the fuel dispenser 12 (step 7). The customer then proceeds to the receipt station 20 (step 8) and inputs the indicia, for example by entering the code on a keypad. The receipt station 20 transmits this indicia to the system controller 14 (step 9), which uses it to retrieve that customer's transaction accounting. The accounting is transmitted to the receipt station 20 (step 10), which prints a receipt for delivery to the customer (step 11). Note that in this configuration, only one receipt station 20 is required to service a large number of fuel dispensers 12, thus reducing the cost and increasing the reliability of each fuel dispenser 12. Additionally, maintenance requirements are reduced, as only the receipt station 20 need be checked periodically for the replacement of receipt printing paper.

Figure 6:
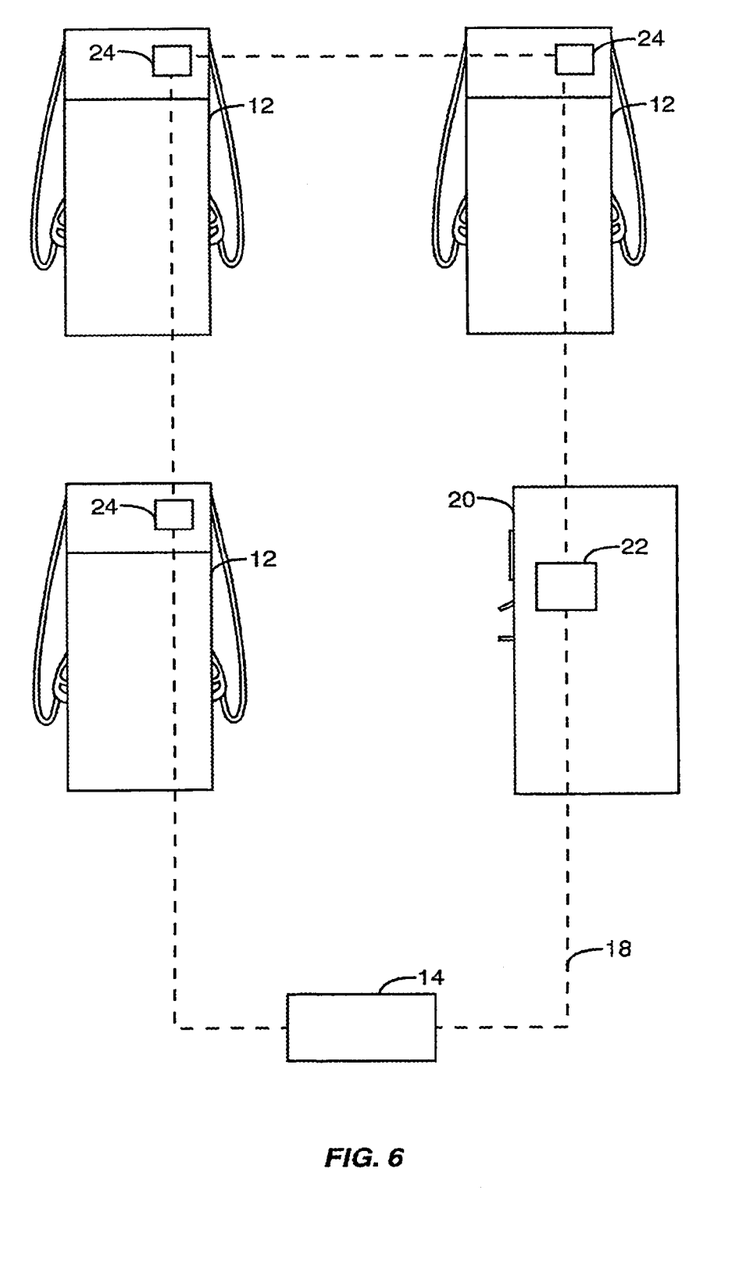
FIG. 6 is a schematic diagram depicting fuel dispensers, a receipt station, and a system controller connected by a LAN.

In another aspect, the present invention relates to a receipt station 20 located separately from one or more fuel dispensers 12, wherein the system controller 14 is located remotely from the fuel dispensers 12, and all of the components are connected in data transfer communication in a peer-to-peer configuration, such as a Local Area Network (LAN). This configuration is depicted schematically in FIG. 6.

One of ordinary skill in the art will recognize that the above embodiments refer to physical placement and logical interconnection of three components: one or more fuel dispensers 12, a system controller 14, and a receipt station separate from the one or more fuel dispensers 20. The various functions discussed above may be implemented in many ways, all of which fall within the scope of spirit of the present invention, as discussed more fully herein.

B. Transaction Processing

The fuel sales transaction is processed by the system controller 14 (whether co-located with the fuel dispenser 12, with the receipt station 20, or separate from both) via conventional credit card transaction authorization processing, which is well known in the art. The data communications links to perform such processing may be via satellite communications, cellular or similar wireless telephony, or over the Public Switched Telephone Network (PSTN). Additionally or alternatively, the credit card transaction authorization processing could occur across a wide-area network (WAN), for example, one linking all regional service stations of a particular fuel distributor (i.e., BP®, EXXON®, etc.). The WAN could process only private-issue credit card transactions, or could additionally process general credit card transactions from a central (regional) processing center.

Additionally or alternatively, account balances may be maintained by customers and debited at the completion of each fuelling transaction. These balances could be maintained, for example, on smart cards, or in computers integrated into or carried in customers' vehicles. A functionally equivalent debit system, from the customer's point of view, could comprise a prepaid card, presentment of which at the fuel dispenser 12 debits from the existing balance the total of the instant transaction. Such cards are presently sold for prepaid long distance telephone connect time and as gift certificates at retail stores, among other uses. Present cards are typically magnetic stripes, but could comprise any token upon or within which can be impressed a recognizable indicia (i.e., optical indicia, passive transponders, etc.).

C. Customer Identification

The customer is uniquely identified upon arrival at a fuel dispenser 12, and again upon arrival at the receipt station 20 so that the customer may be properly identified by the receipt station to give the customer the proper accounting of the fueling transaction. One method of determining customer identification indicia employed by the fuel dispensers 12 is to use the customer's account number, obtained, for example, from a card reader 15 such as a magnetic stripe card reader. This could represent a credit card account (either specific to the fuel vendor or a general purpose consumer credit card), debit card account, bank account accessed via ATM card, etc. The account number could also represent a prepaid account with a balance against which the instant transaction is to be debited, with the account information residing either in a central database accessed by the system controller 14, or locally in the customer's possession (such as, for example, through the use of a smart card containing microelectronic circuits, or by accessing a computer or controller on or in the customer's vehicle). Alternatively, the fuel dispenser 12 and/or the receipt station 20 may be equipped with transponder communication for customer identification.

The account number or other customer identification indicia may serve as identifying indicia for the system controller 14 to track the transaction accounting, as well as providing the account number necessary to initiate the transaction authorization process. The account number is transmitted from the fuel dispenser 12 to the system controller 14 upon initiation of the transaction, and is later transmitted from the receipt station 20 to the system controller 14 when the customer moves to the receipt station 20 to obtain a receipt. The number serves as the indicia that the system controller 14 uses to index the transaction accounting, to responsively send the accounting to the receipt station 20. As an alternative to the magnetic stripe card reader described above, the customer account number could comprise an optical code, for example a bar code, read by an appropriate card reader at the fuel dispenser 12 and at the receipt station 20. Additionally, any method generally known in the art for transmitting a customer account number to a credit transaction authorization processing apparatus could be employed in the broad practice of the present invention.

Figure 7A:
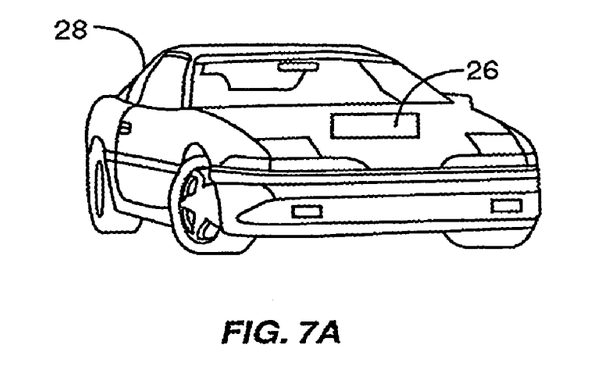
FIG. 7 depicts possible locations for a customer transponder.
Figure 7B:
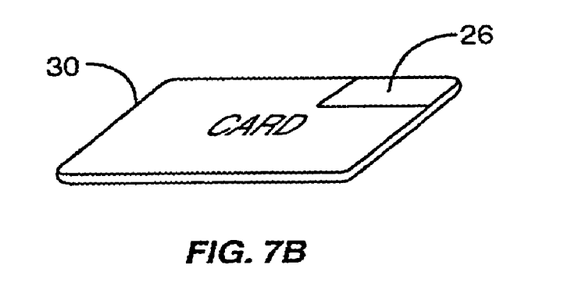
Figure 7C:
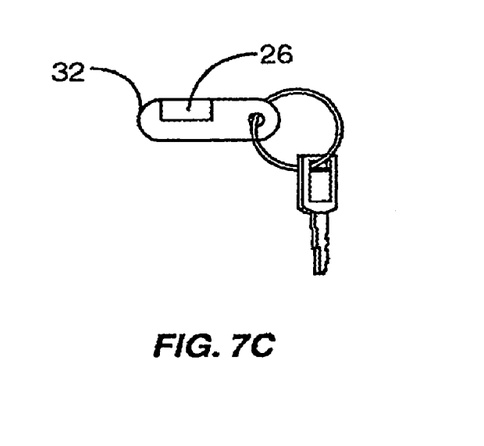

Alternatively, customer identification may comprise obtaining an identifying indicia from the customer that is used to index a database and retrieve an account number and other information. This could include, for example, a PIN input by the customer on a keypad, or a card containing a magnetic stripe or optical indicia (i.e., a bar code) coupled with the appropriate reading device on the fuel dispenser 12 and the receipt station 20. The indicia could comprise a code representing biometric information, such as the fingerprint, iris scan, facial image, voice print, etc., of individual customers. The customer identifying indicia could be obtained automatically by a proximity sensor and passive transponder. This would illustratively require a radio frequency "handshake" between the fuel dispenser 12 or receipt station 20 and the customer's vehicle, such as that disclosed in U.S. Pat. No. 5,956,259, Intelligent Fuelling, issued on Sep. 21, 1999 to Hartsell, Jr. et al., incorporated herein by reference. An appropriate transponder could be temporarily or permanently mounted on the customer's vehicle, or could be portable and carried by the customer within the vehicle, such as for use in rental cars. Illustrative examples of transponder placement are shown in FIG. 7. In FIG. 7A, transponder 26 is installed in customer vehicle 28. In FIG. 7B, transponder 26 is embedded in card 30, of the general size and shape of a conventional credit card. In FIG. 7C, transponder 26 is embedded in key chain fob 32, which could be of a wide variety of sizes and shapes, as dictated by current fashion trends and consumer taste. These examples are illustrative only; the transponder could alternatively take many other forms. The transponder may transmit to the fuel dispenser 12 only a customer identification indicia, or additionally it may be configured to transmit fuel grade selection, the option of additional purchases such as a car wash, and other data as appropriate or useful.

D. Transaction Accounting Delivery

The fuel purchase transaction accounting is delivered, if desired, to the customer at a receipt station 20 with the fuel dispenser 12 at which he received the fuel. This reduces the cost, increases the reliability, and reduces the maintenance requirements of each fuel dispenser 12. According to the present invention, upon proceeding to the receipt station 20, a customer would enter his customer identification indicia, which could be of any of the forms explicated above, and may be detected automatically by the receipt station 20. The system controller 14 uses this indicia to index into its database of transactions, and responsively transmit to the receipt station 20 the transaction accounting for that customer. The receipt station 20 then delivers the accounting to the customer. Actual delivery of the accounting to the customer may be in any of several forms.

In one aspect, the receipt station 20 is a conventional ink- or toner-on-paper printer (dot matrix printer, laser printer, thermal transfer printer, etc.). These printers are currently included on each self-service fuel dispenser 12, and their implementation is well known in the art.

Alternatively, the transaction accounting may be transmitted to a computer or controller within or integrated into the customer's vehicle, and the receipt printed and presented to the customer within his own vehicle. Alternatively, the transaction accounting may be stored by the customer's computer and later transferred to another computer, or printed at a later time, optionally combining data into various reports, such as all fuel purchase transactions for a specific period, within a specific region, from a specific vendor, etc.

It will be noted that those customers who do not desire a receipt or accounting of their transaction may simply drive off after the fueling operation completes. The receipt station 20 will only initiate an accounting transfer from the system controller 14 upon receiving a customer identification indicia from a customer. The system controller 14 will store the transaction accounting data for some reasonable amount of time, to allow for some delay between a customer's fuelling his vehicle at a fuel dispenser 12 and requesting a receipt at the receipt station 20.

Figure 8:
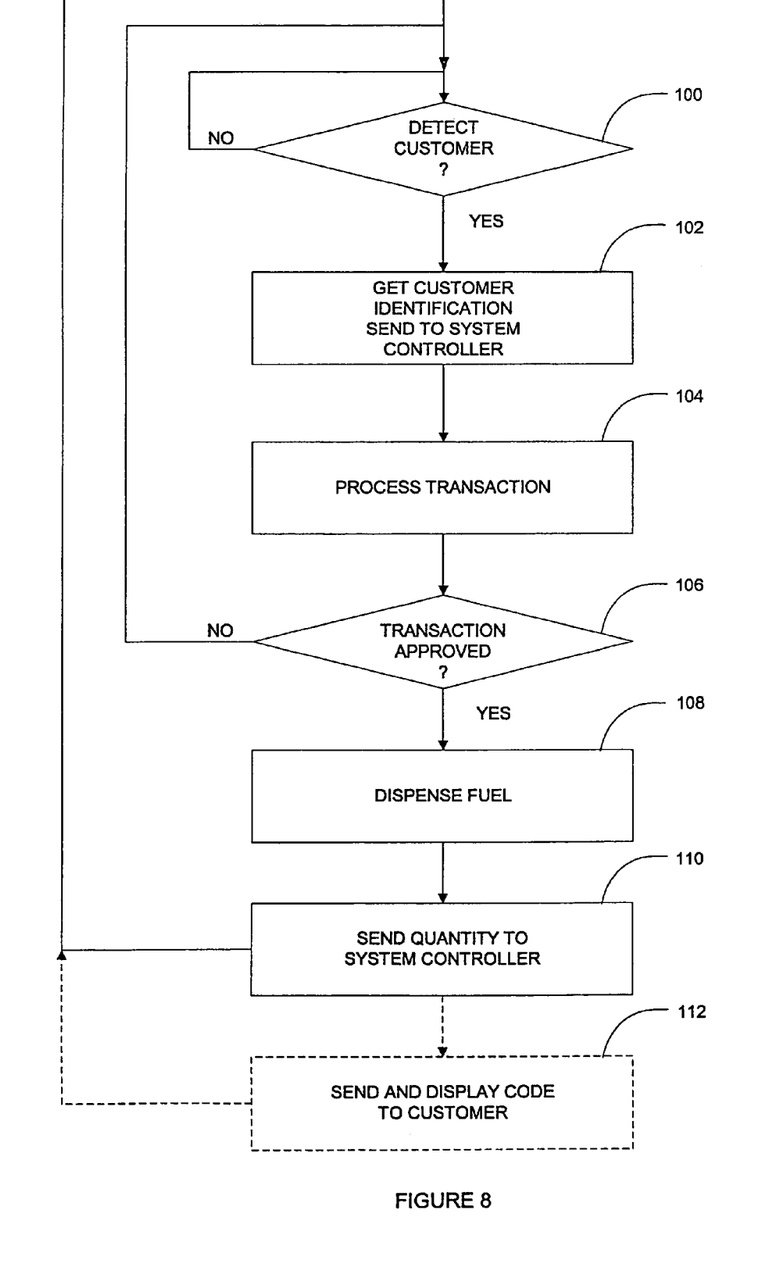
FIG. 8 is a flow chart of the fuel dispensing operation of the present invention.

The general procedure of conducting a fuel sales and delivery transaction according to the present invention is depicted in a flow chart formation in FIG. 8. A given fuel dispenser waits in an idle state 100 for input of a customer identification indicia. Upon receipt of such indicia (via a magnetic stripe card reader, biometric sensor, automated proximity sensor and transponder receiver, etc.), it is transmitted to the system controller 14 (step 102), along with concomitant customer selections such as fuel grade, quantity desired, etc. The system controller 14 processes the request (step 104). This may comprise traditional credit card transaction authorization, debit of a locally maintained account, communication with and debit of customer's smart card or a computer in or on customer's vehicle, etc. If the transaction is not approved, the customer is so informed, the fuel dispensing process aborts, and control returns (step 100) to await another customer or another attempt by the same customer. Upon approval of the transaction (step 106), the system controller 14 sends the fuel dispenser 12 an authorization, either for a specific amount of fuel or to fill the vehicle's tank, and the fuel dispenser 12 dispenses fuel (step 108), either under manual control of the customer or an attendant, or automatically through a robotic system. Upon completion of the fuel dispensing operation, the fuel dispenser 12 sends the quantity and grade of fuel dispensed to the system controller 14 (step 110). The system controller 14 may, in some embodiments of the present invention, then relay an indicia to the fuel dispenser 12 (step 120), for display to the customer, along with instructions to obtain a receipt. In other embodiments, no such provision of indicia to the customer is required (as customer indicia is detected automatically at the receipt station 20). The fuel dispenser 12 then returns to idle state 100 to await the next customer.

Figure 9:
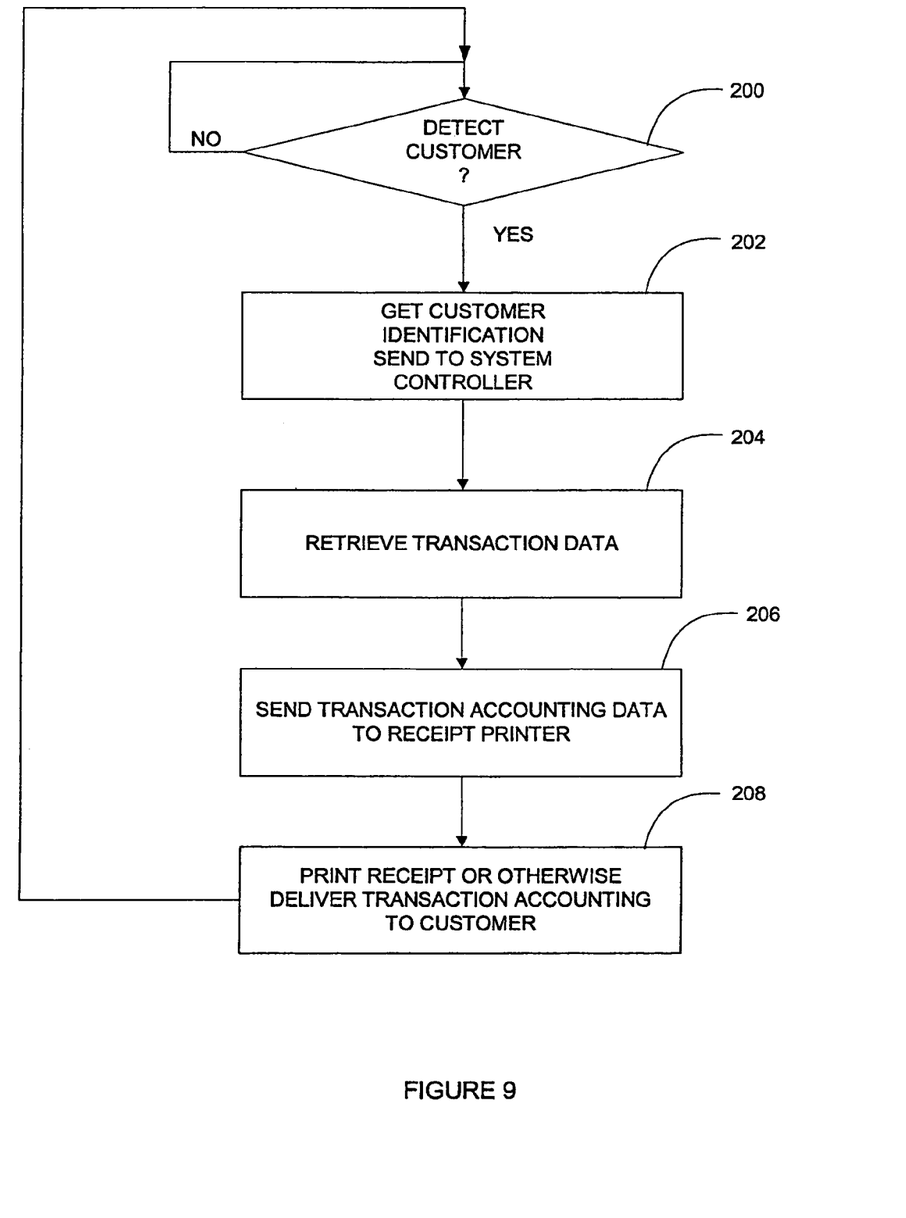
FIG. 9 is a flow chart of the receipt printing operation of the present invention.

If the customer does not require or desire an accounting of the transaction, he may drive away at this point and the transaction is complete. If the customer does desire a receipt, as depicted in a flow chart formation in FIG. 11, the customer proceeds to the receipt station 20, which is in idle state 200 awaiting customer identification indicia input. Upon receipt of such indicia (via a keypad, magnetic stripe card reader, biometric sensor, automated proximity sensor and transponder receiver, etc.), it is transmitted to the system controller 14 (step 202). The system controller 14 uses the indicia to index its database of fuel sales transactions, and retrieves the customer's transaction information (step 204). The system controller 14 transmits a transaction accounting to the receipt station 20 (step 206). The accounting includes price, quantity, and transaction total, and may additionally include such information as customers name, date and time, fuel grade, remaining debit account balance, fuel dispenser 12 location, indicia for accessing additional purchased products and services (such as a car wash), advertising messages, etc. The receipt station 20 delivers the accounting to the customer (step 208), by printing a paper receipt, transmitting the data to the customer's vehicle computer, or other means. The receipt station 20 then returns to idle state 200 to await the next customer who desires to obtain a transaction accounting.

Figure 10:
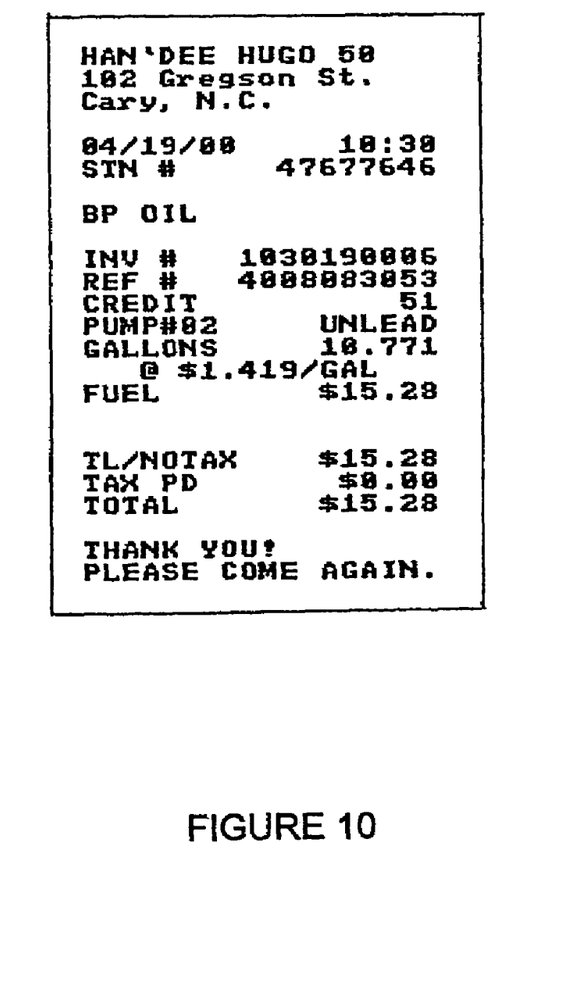
FIG. 10 is an example of a printed receipt.

FIG. 10 depicts a representative printed receipt as may be printed and delivered to the customer at the receipt station 20, according to the present invention.

While the invention has been described herein with reference to specific aspects, features, and embodiments, it will be apparent that other variations, modifications, and embodiments are possible, and all such variations, modifications, and embodiments therefore are to be regarded as being within the spirit and scope of the invention.

What is claimed is:

1. A fuel dispensing system, comprising:
   a system controller;
   at least one fuel dispenser in data transfer communication with said system controller, configured to dispense fuel to a vehicle, said at least one fuel dispenser not having a receipt printer, said fuel dispenser further adapted to receive payment from a customer associated with the vehicle, said payment for a fueling transaction; and
   a transaction accounting delivery station in data transfer communication with said system controller, and located remotely from said at least one fuel dispenser, configured to deliver a transaction accounting associated with the fueling transaction to the customer associated with the vehicle upon request of the customer associated with the vehicle,
   wherein the customer associated with the vehicle is provided with indicia at said at least one fuel dispenser at a completion of a fuel dispensing transaction, and wherein the customer associated with the vehicle inputs said indicia at said remotely located transaction accounting delivery station to obtain a transaction accounting.

2. The fuel dispensing system of claim 1, wherein said at least one fuel dispenser is manually operated.

3. The fuel dispensing system of claim 1, wherein said at least one fuel dispenser is automated.

4. The fuel dispensing system of claim 1, wherein said system controller is co-located with said at least one fuel dispenser.

5. The fuel dispensing system of claim 1, wherein said transaction accounting delivery station is positioned within a fueling environment, and wherein said fueling environment also contains said at least one fuel dispenser.

6. The fuel dispensing system of claim 1, wherein customer identifying data is detected at said at least one fuel dispenser and at said transaction accounting delivery station, and wherein the customer inputs said indicia at least in part by positioning the vehicle proximate to said transaction accounting delivery station.

7. A fuel dispensing system, comprising:
   a system controller;
   at least one fuel dispenser in data transfer communication with said system controller, configured to dispense fuel to a vehicle, said at least one fuel dispenser not having a receipt printer, said fuel dispenser further adapted to receive payment from a customer associated with the vehicle, said payment for a fueling transaction;
   a transaction accounting delivery station in data transfer communication with said system controller, and located remotely from said at least one fuel dispenser, configured to deliver a transaction accounting associated with the fueling transaction to the customer associated with the vehicle upon request of the customer associated with the vehicle; and
   wherein customer identifying data is detected at said at least one fuel dispenser and at said transaction accounting delivery station, and wherein the customer associated with the vehicle receives a transaction accounting in response to positioning customer's vehicle proximate to said transaction accounting delivery station.

8. The fuel dispensing system of claim 7, wherein the customer associated with a vehicle is provided with indicia at said at least one fuel dispenser at the completion of a fuel dispensing transaction, and wherein the customer associated with the vehicle inputs said indicia at said remotely located transaction accounting delivery station to obtain a transaction accounting.

9. The fuel dispensing system of claim 7, wherein said at least one fuel dispenser is manually operated.

10. The fuel dispensing system of claim 7, wherein said at least one fuel dispenser is automated.

11. The fuel dispensing system of claim 7, wherein said system controller is co-located with the at least one fuel dispenser.

12. An integrated robotic fueling facility, comprising:
   a control and transaction processing unit;
   a plurality of fuel dispensing stations in data transfer communication with said control and transaction processing unit, each fuel dispensing station comprising:
      a first sensor configured to detect the presence of a proximate customer vehicle; and further to obtain a unique customer identification indicia via operative communication with a transponder located on the customer vehicle;
      an automated fuel dispenser whereby fuel is dispensed directly into the customer vehicle in response to authorization from said control and transaction processing unit, said fuel dispenser not having a receipt printer;

a payment acceptor associated with said automated fuel dispenser; and a display whereby fuel transaction information is dynamically displayed to a customer during and following fuel dispensing, said transaction information selected from the group consisting of fuel amount, fuel price, fuel grade, transaction total and advertising messages; and a single transaction accounting delivery station in data transfer communication with said control and transaction processing unit, located separately from the fuel dispensing stations and adapted to serve the fuel dispensing stations, comprising:

a second sensor configured to detect the presence of a customer vehicle; and further to obtain a unique customer identification indicia via operative communication with a transponder located on the customer vehicle; and a transaction accounting delivery system, whereby a transaction accounting is automatically prepared and presented to the customer if the customer vehicle is placed proximate to the transaction accounting delivery station, the transaction accounting being transferred from said control and transaction processing unit.

13. An integrated robotic fueling facility, comprising:
a control and transaction processing unit;
a plurality of fuel dispensing stations in data transfer communication with said control and transaction processing unit, each fuel dispensing station comprising:
means for uniquely identifying a customer associated with a vehicle;
means for accepting payment from the customer; and
means for automatically dispensing fuel into the customer's vehicle;
wherein each fuel dispensing station automatically dispenses fuel into the customer's vehicle upon authorization by said control and transaction processing unit;
wherein each fuel dispensing station does not have a receipt printer; and
a single transaction accounting dispensing facility in data transfer communication with said control and transaction processing unit and located within the fueling facility, located separately from said fuel dispensing stations, and adapted to serve the fuel dispensing stations, comprising:

means for uniquely identifying the customer associated with the vehicle; and means for delivering a transaction accounting to the customer associated with the vehicle upon request from the customer;

wherein a transaction accounting is optionally delivered to the customer associated with the vehicle if the customer associated with the vehicle is identified at said transaction accounting dispensing facility through indicia provided to the customer at one of the plurality of fuel dispensing stations upon completion of dispensing fuel into the customer's vehicle, the transaction accounting being transferred from said control and transaction processing unit.

14. The facility of claim 13, wherein the customer identification means comprises at least one passive transponder located on the customer's vehicle and an operationally compatible sensor located at said fuel dispensing station, said transponder transmitting a unique code to said sensor that identifies data selected from the group consisting of customer identification, fuel grade selection, quantity of fuel requested, and customer account information.

15. The facility of claim 13, wherein said customer identification means comprises a token containing machine readable indicia in the possession of the customer, and an operationally compatible sensor located at said fuel dispensing station, whereby said indicia is read from said token when the customer presents said token to said sensor.

16. The facility of claim 13, wherein said customer identification means comprises a biometric sensor located at said fuel dispensing station, whereby indicia unique to each customer is generated by said customer presenting physical characteristics to said sensor.

17. The facility of claim 16, wherein said physical characteristics are selected from the group consisting of fingerprints, iris pattern, facial features, or genetic samples.

18. The facility of claim 13, wherein said transaction accounting delivery means comprises printing and delivering to the customer a paper receipt.

19. The facility of claim 13, wherein said transaction accounting delivery means comprises transmitting said transaction accounting to a computer in the possession of the customer.

* * * * *